United States Patent
Leiderer

(10) Patent No.: US 7,827,867 B2
(45) Date of Patent: Nov. 9, 2010

(54) PRESSURE SENSING DEVICE

(75) Inventor: Hermann Leiderer, Wiesent (DE)

(73) Assignee: Continental Automotive GmbH, Hannover (DE)

( * ) Notice: Subject to any disclaimer, the term of this patent is extended or adjusted under 35 U.S.C. 154(b) by 88 days.

(21) Appl. No.: 12/309,501

(22) PCT Filed: Jul. 12, 2007

(86) PCT No.: PCT/EP2007/057190

§ 371 (c)(1),
(2), (4) Date: Feb. 2, 2009

(87) PCT Pub. No.: WO2008/009622

PCT Pub. Date: Jan. 24, 2008

(65) Prior Publication Data

US 2009/0301212 A1    Dec. 10, 2009

(30) Foreign Application Priority Data

Jul. 19, 2006    (DE) .................. 10 2006 033 467

(51) Int. Cl.
 *G01L 7/10* (2006.01)
(52) U.S. Cl. ...................... 73/729.2; 73/756
(58) Field of Classification Search .............. None
See application file for complete search history.

(56) References Cited

U.S. PATENT DOCUMENTS

| | | | |
|---|---|---|---|
| 5,606,117 A * | 2/1997 | Vogel et al. | 73/114.18 |
| 5,872,315 A | 2/1999 | Nagase et al. | |
| 6,732,589 B2 * | 5/2004 | Eickhoff et al. | 73/715 |
| 6,805,010 B2 | 10/2004 | Kuhnt et al. | |
| 7,152,483 B2 | 12/2006 | Mast et al. | |
| 2002/0100330 A1 * | 8/2002 | Eickhoff et al. | 73/715 |
| 2002/0134164 A1 | 9/2002 | Ante et al. | |
| 2003/0182783 A1 | 10/2003 | Kuroda et al. | |
| 2004/0200286 A1 | 10/2004 | Mast | |
| 2005/0051140 A1 * | 3/2005 | Yamaguchi et al. | 123/479 |
| 2005/0193826 A1 * | 9/2005 | Oda et al. | 73/715 |
| 2009/0090189 A1 * | 4/2009 | Villaire | 73/723 |

FOREIGN PATENT DOCUMENTS

| | | | |
|---|---|---|---|
| CN | 201262580 Y * | 6/2009 | |
| DE | 19735892 A1 | 11/1998 | |
| DE | 10054013 A1 | 5/2002 | |

(Continued)

*Primary Examiner*—Andre J Allen
(74) *Attorney, Agent, or Firm*—Cohen Pontani Lieberman & Pavane LLP

(57) ABSTRACT

A pressure sensing device comprising a base element for fastening the pressure sensing device provided with a connecting duct for feeding a pressurized fluid. The pressure sensing device has a support member that extends along a plugging direction and is fitted with a plug-in connector section configured to be plugged into a complementary plug-in connector. The support member is connected to the base and is equipped with a pressure duct that is connected to the connecting duct, and encompasses a receiving hole which extends perpendicular to the plugging direction and communicates with the pressure duct. The pressure sensing device includes a pressure sensor element that is inserted into the receiving hole such that one of the surfaces of the pressure sensor element is exposed to pressure from the pressure duct, and is connected to contact elements for transmitting signals.

20 Claims, 2 Drawing Sheets

FOREIGN PATENT DOCUMENTS

| | | |
|---|---|---|
| DE | 102 28 000 A1 | 1/2004 |
| DE | 1022800 A1 | 1/2004 |
| DE | 10315405 A1 | 1/2004 |
| EP | 0284633 A1 | 10/1988 |
| EP | 0790382 | 9/1997 |
| EP | 1203937 A1 | 5/2002 |
| FR | 2861836 A1 * | 5/2005 |
| JP | 10299535 A * | 11/1998 |

* cited by examiner

US 7,827,867 B2

PRESSURE SENSING DEVICE

PRIORITY CLAIM

This is a U.S. national stage of application No. PCT/EP2007/057190, filed on 19 Jul. 2007, priority is claimed on the following application German Application No.: 10 2006 033467.1, filed 19 Jul. 2006, the contents of both of which are incorporated here by reference.

BACKGROUND OF THE INVENTION

Field of the Invention

The present invention relates to a pressure detection device for the detection of pressures in lines or containers which contain a pressure-transmitting fluid, and, in particular, also to a pressure detection device for use in motor vehicles.

In the measurement of pressures, for example the oil pressure in internal combustion engines or the rail pressure in common-rail engines, the leaktightness or seal between a device for detecting the pressure and the connection, for example, to the line or to the container having the fluid whose pressure is to be measured often has to satisfy stringent requirements. Pressure detection devices are therefore frequently used which have a metal connection piece as a junction piece for the connection. The use of a metal connection piece has the advantage, in particular, that high screw-on forces or screw-on torques can be employed during assembly and, inter alia, the stringent requirements to be met as regards pressure tightness of the junction can therefore also be fulfilled. In addition, such pressure detection devices may be used even at high temperatures.

Conventionally, the actual pressure sensor element, for example a ceramic pressure sensor element or a special piezoresistive measuring cell, is then introduced into the metal connection piece. The pressure sensor element is connected to a circuit board, typically by wire bonding. Since the connection of the pressure detection device is to take place via a plug connection, such a pressure detection device comprises a plug connector part with contact elements. The plug connector part is usually connected to the metal connection piece by means of the flanging of a corresponding portion of the metal connection piece, and therefore it is not possible to have a simple junction of the contact elements with the connections of the circuit board. The contact elements are therefore connected to corresponding connections of the circuit board by means of flexible foils having conductor tracks and press tongs, or they are designed as knife contacts and are connected to the connections of the circuit board via corresponding lines.

The production of such a pressure detection device is therefore comparatively complicated.

SUMMARY OF THE INVENTION

An object on which the present invention is based, therefore, is to provide a pressure detection device which can be produced in a simple way.

The object is achieved by means of a pressure detection device, with a base element for holding the pressure detection device, which base element has a connecting duct for the supply of a pressurized fluid, with an extended carrier body, which extends along a plugging direction, at one end has a plug connector portion for plugging together with a complementary plug connector in the plugging direction, at the other end is connected to the base element and has a pressure duct connected to the connecting duct, and possesses a reception orifice running transversely with respect to the plugging direction and communicating with the pressure duct, and with a pressure sensor element which is inserted, pressure-tight, into the reception orifice, so that one of the pressure-sensitive sensor surfaces of the pressure sensor element is exposed to pressure from the pressure duct, and which is connected to contact elements in the plug connector portion for the transmission of signals.

A carrier body is understood, in particular, to mean a carrier body which, seen as a whole, is not developed. Preferably, although the length of the carrier body in the plugging direction is greater than the extent transversely to the plugging direction, this does not necessarily need to be the case.

Such a pressure detection device can be produced very simply, since the mounting of the pressure sensor element can take place through the reception orifice of the carrier part which at the same time functions as a plug connector. This mounting may in this case take place before or after the connection of the carrier body to the base element which serves for holding the pressure detection device on, or for connecting the pressure detection device to, the line or the container or a connection of the line or container.

Furthermore, due to the extended form of the pressure detection device, a particularly simple mounting of the latter on a line or a container is obtained, since both the fastening of the base element and that of a plug complementary to the plug connector portion can take place from the same direction and therefore occupy only a small amount of space. This is of considerable advantage particularly in motor vehicle construction.

Further, by the pressure sensor element being arranged in the carrier part, a partially thermal decoupling from the base element can be obtained, which allows more accurate pressure measurements even in the case of varying temperatures of the line or of the container. Moreover, a thermal decoupling of the pressure-carrying fluid from the base element in the region of the pressure sensor element can occur, which may likewise lead to higher measuring accuracy. This is the case particularly when, as is preferred, the pressure duct ends in the reception orifice and, if appropriate, in the carrier body, and therefore no appreciable convection of the fluid in the pressure detection device occurs.

The base element may, in principle, consist of any desired material suitable for holding. Preferably, it consists of metal. This has the advantage that high strength is afforded, along with a low price and simple production. In particular, it can be formed advantageously in a simple way by means of known methods.

The base element may, in principle, be configured in any desired way for connection to a line or a container. Preferably, however, the base element has an external thread for fastening in an orifice of a line or of a container having a corresponding internal thread. The use of a thread not only allows reliable fastening, but also makes it possible to have a very good leaktightness of the connection.

Furthermore, this embodiment makes it possible for the carrier body to be connected to the base element by means of a flanged connection. For this purpose, the carrier body may have, particularly at the corresponding end, a peripheral flange which is surrounded, after flanging, by a corresponding portion of the base element.

The base element does not necessarily need to have special structures in order to be mounted on a line or a container. For example, it could have a cylindrical surface area which, during mounting, is held by means of tongs. Preferably, however, the base element has at least one mounting structure, preferably on its outer surface, particularly preferably in the form of a hexagonal structure. Preferably, the largest diameter of the carrier body is smaller than the smallest diameter of the hexagonal structure. The advantage of this is that mounting can then take place from the plugging direction, for example by means of a socket wrench similar to a socket wrench for the tightening of spark plugs.

The pressure duct may basically be connected to the connecting duct in any desired way. This is understood to mean that the pressure detection device is designed such that a fluid can transmit pressure from the connecting duct to a fluid in the pressure duct. In particular, the two ducts can communicate, that is to say allow an exchange of the fluid, that is to say of a gas or a liquid. For example, the connecting duct may be arranged with its mouth directly opposite the mouth of the pressure duct and consequently be connected to the latter. However, the connecting duct and the pressure duct may also be connected via a chamber, for example between the base element and carrier body.

An embodiment of the pressure detection device which can be produced in a particularly simple way is obtained when the connecting duct and a portion of the pressure duct which is connected to said connecting duct run rectilinearly.

The pressure duct may, in principle, run in any desired way. In a particularly preferred embodiment, in particular a development of the embodiment described in the above paragraph, the carrier body is designed such that the pressure duct leads, with an end portion running transversely or at an inclination with respect to the plugging direction, into the reception orifice. The advantage of this is that the pressure duct can be produced in a particularly simple way; in particular, it may then have only two rectilinear portions adjoining one another. An oblique run is in this case understood to mean that a longitudinal axis of the end portion forms with the plugging direction an angle greater than 1°, preferably greater than 10°.

Further, it is preferable that the carrier body is designed such that there lies between the pressure duct and the reception orifice a web on which the pressure sensor element or a carrier element for the pressure sensor element is held and/or lies. This embodiment has the advantage that, on the one hand, a compact set-up can be achieved and, on the other hand, a simple introduction of the pressure sensor element or of a carrier element having the pressure sensor element into the reception orifice and a simple fastening thereof in the latter become possible.

In principle, the carrier body may be of multipart design. Preferably, however, it is designed in one piece. The carrier body can thus be highly stable, but at the same time can be produced in a simple way. Materials to be considered, from which the carrier body may be manufactured, are in this case not only metal, but, above all, ceramic materials and plastics, in particular plastics resistant to high temperatures.

The carrier body basically needs merely to be designed in extended form. In this case, in particular, it may also have projections, for example the fastening flange already mentioned, or set-back regions, for example in the region of the plug connector portion. A particularly simple production of the carrier body is obtained if the carrier body is cylindrical at least with the exception of the plug connector portion and, if present, the fastening flange.

In principle, the pressure sensor element may be arranged in the reception orifice in any desired orientation suitable for its functioning. It is preferable, however, if the pressure sensor element is arranged such that a perpendicular to a pressure-sensitive surface of the pressure sensor element runs orthogonally or obliquely with respect to the plugging direction. This orientation of the pressure sensor element has the advantage that this or a carrier element carrying this can separate, pressure-tight, the reception orifice from the pressure duct in said reception orifice.

The signals from the pressure sensor element may, in principle, be processed outside the carrier body. Preferably, however, evaluation electronics for the evaluation and, if appropriate, activation of the pressure sensor element are arranged in the carrier body, thus reducing disturbances of the signals by the pressure sensor element and allowing a simple electrical connection.

In a preferred embodiment of the pressure detection device, the pressure sensor element and evaluation electronics for the activation and/or evaluation of signals from the pressure sensor element are integrated on a chip which is connected, in particular contacted, with the contact elements for signal transmission. Thus, only one component needs to be fastened in the carrier body, and the influence of noise fields on signal transmission between the pressure sensor element and evaluation electronics can be greatly reduced. The chip may also be interpreted as a carrier element for the pressure sensor element.

In another preferred embodiment of the pressure detection device, the pressure sensor element and evaluation electronics for the activation and/or evaluation of signals from the pressure sensor element are held on a carrier element, the evaluation electronics being connected to the contact elements for signal transmission. This embodiment, too, has the advantage that only one component needs to be inserted into the carrier body and fastened in the latter. In this case, in particular, a ceramic plate or a circuit board may serve as carrier element.

A further advantage of the embodiments mentioned in the last two paragraphs is that the chip or connections of the carrier element can be contacted directly with the contact elements, for which purpose, in particular, bonding wires or wire bonds or other flexible conjunctions may be used. It is also possible, however, to select other contacting possibilities mentioned in the introduction.

The fastening of the chip or of the carrier element to the carrier body may take place basically in any desired way. The advantage of particularly simple mounting arises when the chip or the carrier element is adhesively bonded to the carrier body. Preferably, an adhesive is used which gives an elastic adhesive bond, so that a compensation of mechanical stresses between the chip and the carrier element becomes possible.

Particularly during use in the motor vehicle sector, the pressure detection device may be exposed to moisture and/or to other liquids or gases which may possibly impair the functioning of the device. To protect against such influences, preferably, the chip or the carrier element is covered with protective material. This protective material may be, in particular, a gel which fills the reception orifice over its cross section as completely as possible.

Further, the pressure detection device may comprise a cover which closes the reception orifice. As a result, the pressure sensor element or the chip or the carrier element and also protective material, present if appropriate, are protected, in particular, against mechanical influences.

However, the cover may also fulfill further functions. Thus, in a preferred embodiment of the pressure detection device, the cover closes the reception orifice, gas-tight, with the exception of a connecting orifice. This pressure detection device may then be used as a differential pressure detection device which detects the pressure difference between the pressure in the connecting duct and the pressure in the connecting orifice.

The pressure detection device may, however, also be designed for the detection of absolute pressures. For this purpose, the pressure sensor element is then designed for measuring an absolute pressure. For this purpose, the pressure sensor element is then designed for measuring an absolute pressure. For this purpose, for example, it may have a reference vacuum cell which contains a gas of known pressure.

Alternatively, the pressure sensor element may be fastened to a bottom surface of the reception orifice, and the pressure duct may issue into the reception orifice between the bottom surface and that surface of the carrier body which lies transversely with respect to the plugging direction. In this case, preferably, a cover which closes off, pressure-tight, the reception orifice may be provided.

According to a preferred development, the pressure detection device preferably further has a temperature sensor arranged on the pressure duct. Such a pressure detection device advantageously makes it possible to detect not only the pressure in a fluid, but also the temperature. Particularly preferably, the connections of the temperature sensor are contacted directly with contact elements in the plug connector portion.

The pressure detection device may be designed for the measurement of pressures in various ranges, for example up to 100 bar.

BRIEF DESCRIPTION OF THE DRAWINGS

The invention is further explained below, by way of example, with reference to the drawings in which.

DETAILED DESCRIPTION OF THE PRESENTLY PREFERRED EMBODIMENTS

Figure 1:
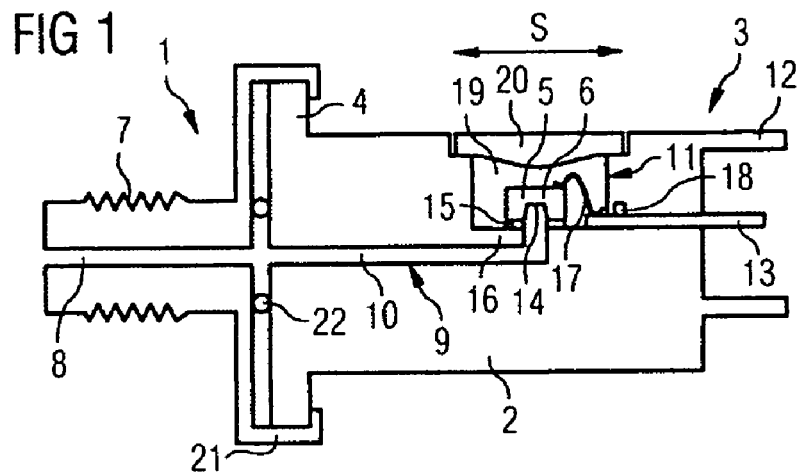
FIG. 1 is a diagrammatic sectional illustration of a pressure detection device according to a first preferred embodiment of the invention.

A pressure detection device according to a first preferred embodiment comprises a base element 1, an extended carrier body 2 which is manufactured from plastic and which at one end comprises a plug connector portion 3 for plugging together with a complementary plug connector, not shown in the figures, in a plugging direction S and at the other end comprises a fastening flange 4, and also a chip 5 with an integrated pressure sensor element 6 and with evaluation electronics for the activation of the pressure sensor element 6 and for the evaluation of signals from the pressure sensor element 6.

The base element 1 is manufactured from metal and, for fastening in an internal thread of a connection of a pressure container having a pressure-carrying fluid, has an external thread 7 and, as a mounting structure, an outer hexagonal portion. An inverted type of construction for an internal thread is likewise possible. The same applies to the design for a plug connection.

Arranged parallel to the axis of the external thread 7 in the base element 1 is a connecting duct 8 which leads through the base element 1 and which serves for carrying the pressure-carrying fluid from the pressure container into the pressure detection device.

The carrier body 2, which extends linearly in the plugging direction S, has a pressure duct 9 of L-shaped design, the longer leg 10 running, at the end having the fastening flange 4, linearly in the plugging direction S and coaxially with the connecting duct 8. The connecting duct 8 therefore also runs in the plugging direction S.

The leg 10 is continued into an end portion which runs orthogonally with respect to the plugging direction S and which issues into a reception orifice 11 which is formed in the carrier body 2 and which extends transversely with respect to the plugging direction S from the outer surface of the carrier body 2 into the interior of the latter and serves for receiving the chip 5.

The plug connector portion 3 of the carrier body 2 includes a receptacle 12 for the plug region of a complementary plug connector and contact element ducts in which contact elements 13 for the plug connector portion 3 are arranged, which reach into the reception orifice 11.

The chip 5 is arranged in the reception orifice 11 such that one of the pressure-sensitive sensor surfaces 14 is oriented orthogonally perpendicular with respect to the plugging direction S and parallel to the direction of the end portion of the pressure duct 9.

The chip 5 is fastened, pressure-tight, to the bottom of the carrier body 2 by means of an adhesive 15, a portion of the chip being fastened on a web 16 between the reception orifice 11 and the pressure duct 9.

The chip 5 is directly contacted or electrically connected with the contact elements 13 in the plug connector portion 3 by means of bonding wires 17. For protection against interfering pulses, a protective capacitor 18 is arranged on the contact elements.

The reception orifice 11 is filled above the chip 5 with a protective gel 19 which, on the one hand, covers the chip 5 and the bonding wires 17 and protects them from moisture and, on the other hand, allows a transmission of pressure from the region of the reception orifice 11 to the chip 5 or the pressure sensor element 6.

The reception orifice 11 is covered by a cover 20.

The carrier body 2 is seated on the base element 1 and is connected to the base element 1 at the outer hexagon 21 by means of a flanged connection. The gap between the carrier body 2 and the base element is sealed, pressure-tight, by a sealing element, for example an O-ring 22, for sealing between metal and plastic, so that no significant pressure loss, as compared with the detection accuracy of the pressure sensor element 6, occurs.

Since the diameter of the carrier body 2 is smaller than the largest outside diameter of the outer hexagon 21, the pressure detection device can be fastened in a simple way by means of a corresponding socket wrench with inner hexagon from the plugging direction S. Then for complete mounting, the complementary plug connector merely needs to be plugged into the receptacle 12 from the same direction.

Figure 2:
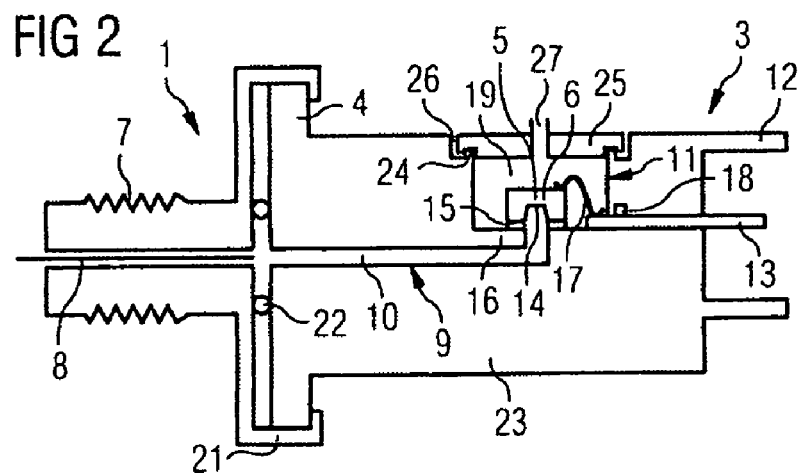
FIG. 2 is a diagrammatic sectional illustration of a pressure detection device according to a second preferred embodiment of the invention.

A pressure detection device according to a second preferred embodiment in FIG. 2 differs from the first exemplary embodiment in the design and fastening of the cover 20 and in the design of the carrier body. All the other parts of the device are unchanged, and therefore the explanations regarding the first exemplary embodiment also apply here and the same reference symbols are used.

The carrier body 23 differs from the carrier body 2 only in that a groove 24 is provided which runs peripherally around the reception orifice. All the other features are unchanged, and the same reference symbols are used for the unchanged features as in the first exemplary embodiment.

The cover 25 differs from the cover 20, on the one hand, in a peripheral wall 26 which engages into the groove 24 and, on the other hand, in a connecting orifice or pressure leadthrough 27, by means of which the region below the cover 25 can be connected to a further pressure container.

A sealing material is located between the cover 25 and the carrier body 23, in order to avoid pressure losses through the gap between these elements.

This pressure detection device can therefore be used as a differential pressure detection device, by means of which the difference between the pressure in the connecting duct 8 and the pressure in the pressure leadthrough 27, propagated through the protective gel 19, can be detected.

Figure 3:
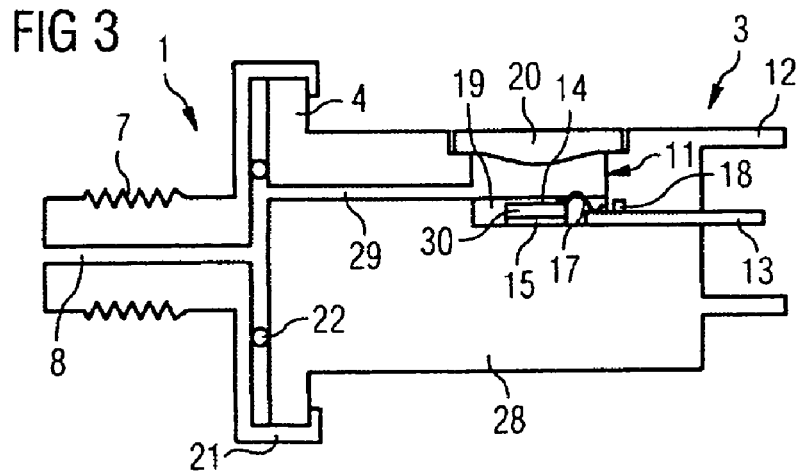
FIG. 3 is a diagrammatic sectional illustration of a pressure detection device according to a third preferred embodiment of the invention.

A pressure detection device according to a third preferred embodiment in FIG. 3 differs from the first exemplary embodiment in the fastening of the cover 20, in the design of the carrier body and in the type of chip 5. All the other parts of the device are unchanged, and therefore the explanations regarding the first exemplary embodiment also apply here and the same reference symbols are used.

The carrier body 28 is designed in the same way as the carrier body of the second exemplary embodiment, although in this case the pressure duct 29, running parallel to the plugging direction, issues into the reception orifice 11 without a bend.

Instead of the chip 5, in this case, a chip 30 suitable for absolute pressure measurements is used, which is glued to the bottom of the reception orifice 11. Otherwise, the chip 30 is contacted and covered with the protective gel 19 in the same way as the chip 5. Covering in this case takes place such that the pressure duct 29 issues into the reception orifice between the cover 20 and the surface of the protective gel.

The cover 20 is in this case connected, pressure-tight, to the carrier body 28, in order to avoid pressure losses through the gap between the cover 20 and the carrier body 28.

This pressure detection device is suitable as an absolute pressure detection device.

Figure 4:
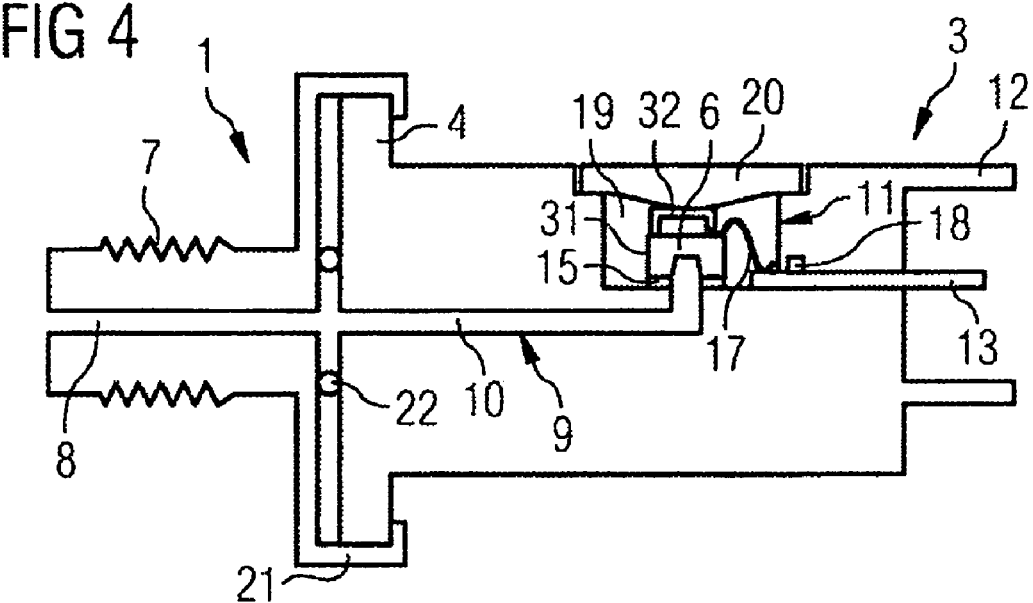
FIG. 4 is a diagrammatic sectional illustration of a pressure detection device according to a fourth preferred embodiment of the invention.

A pressure detection device according to a fourth preferred embodiment in FIG. 4 differs from the first exemplary embodiment in the type of chip. All the other parts of the device are unchanged, and therefore the explanations regarding the first exemplary embodiment also apply here and the same reference symbols are used.

The chip 31 in this case has a vacuum-tight chip cover 32, fastened in a vacuum-tight manner, above the pressure sensor element 6, so as to form a reference vacuum cell in which a reference vacuum prevails.

Absolute pressure detection is thereby possible.

Figure 5:
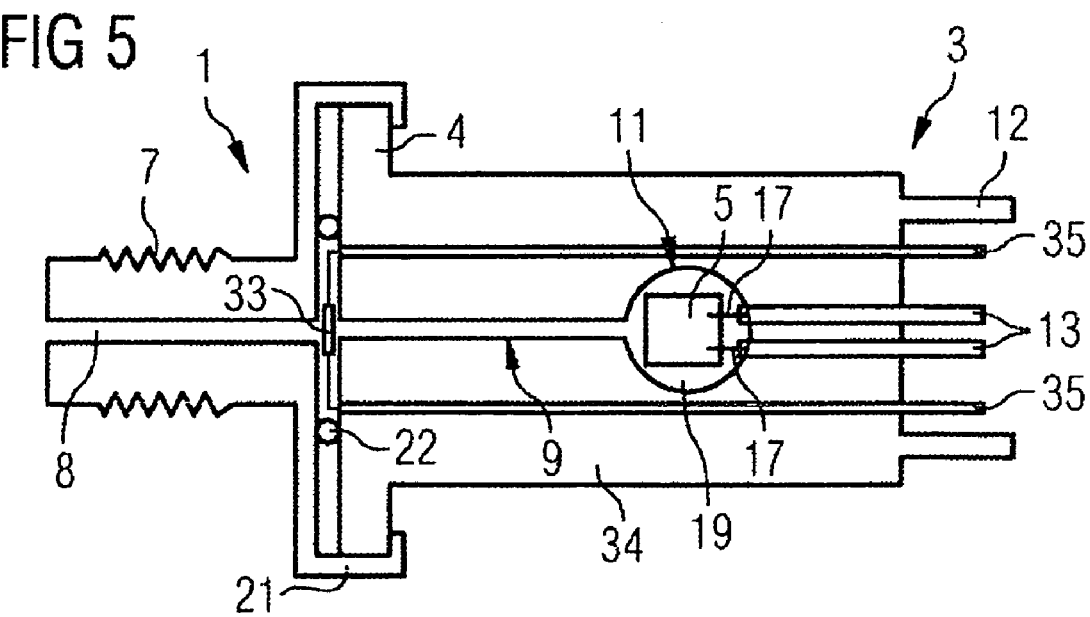
FIG. 5 is a diagrammatic sectional illustration of a pressure detection device according to a fifth preferred embodiment of the invention.

A pressure detection device according to a fifth preferred embodiment in FIG. 5, which shows a sectional plane rotated through 90° with respect to FIG. 1, differs from the first exemplary embodiment in the use of a temperature sensor 33 and in the design of the carrier body. All the other parts of the device are unchanged, and therefore the explanations regarding the first exemplary embodiment also apply here and the same reference symbols are used.

The carrier body 34 differs from the carrier body 2 only in that two further ducts for contact elements 35 are provided, in which are arranged the contact elements 35 which extend from the plug connector region as far as the other end of the carrier body 34. All the other features are unchanged, and the same reference symbols are used for the unchanged features as in the first exemplary embodiment.

In the region of the inlet of the pressure duct 9, the temperature sensor 33 is arranged, which is connected directly to the contact elements 35. The temperature sensor may, of course, also lie in or project into the connecting duct 8. This may also be developed such that the temperature sensor projects out of the connecting duct 8 at least partially from the base element 1. These variants shorten the response times for the temperature measurement.

Thus, in parallel with pressure detection, a detection of the temperature of the fluid whose pressure is detected becomes possible.

This reception of a temperature sensor is also possible correspondingly in other exemplary embodiments.

In further exemplary embodiments, instead of the chip or chips, a circuit board with the evaluation electronics and a pressure sensor element are provided, and are held and contacted in the exemplary embodiments described in the same way as the chip.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure detection assembly comprising:
 a base element having a connecting duct configured to supply a pressurized medium through the base element; and
 a pressure detection device, the pressure detection device configured for mounting in the base, the pressure detection device comprising:
  a carrier body comprising:
   a first end of the carrier body configured to mate with the base element;
   a plug connector portion having contact elements at a second end of the carrier body opposite the first end configured to mate with a plug;
   a reception orifice, the reception orifice arranged transverse to an axis from the first end of the carrier body to the second end of the carrier body; and
   a pressure duct connected to the connecting duct at a first end when the first end of the carrier body mates with the base element, wherein the pressure duct terminates at the reception orifice at a second end; and
  a pressure sensor element mounted in the reception orifice of the carrier body, the pressure sensor element configured to have a pressure-sensitive sensor surface of the pressure sensor element exposed to a pressure from the pressure duct, and the pressure sensor element connected to the contact elements.

2. The pressure detection assembly according to claim 1, wherein the connecting duct and at least a portion of the pressure duct run rectilinearly.

3. The pressure detection assembly according to claim 1, wherein the pressure duct has an end portion that terminates at the reception orifice that is at least one of transverse and inclined with respect to a plugging direction of the plug connector portion.

4. The pressure detection assembly according to claim 1, wherein the carrier body further comprises a web between the pressure duct and the reception orifice, the web configured to maintain at least one of the pressure sensor element and a carrier element upon which the pressure sensor element is mounted.

5. The pressure detection assembly according to claim 1, wherein carrier body is a single piece.

6. The pressure detection assembly according to claim 5, wherein a portion of the carrier body is substantially cylindrical.

7. The pressure detection assembly according to claim 1, wherein the pressure sensor element is arranged such that a perpendicular to a pressure-sensitive surface of the pressure sensor element runs orthogonally or obliquely with respect to a plugging direction of the plug connector portion.

8. The pressure detection assembly according to claim 1, further comprising evaluation electronics configured for at least one of activation of the pressure sensor element and evaluation of signals from the pressure sensor element,
wherein the pressure sensor element and the evaluation electronics are integrated on a chip which is coupled to the contact elements.

9. The pressure detection assembly according to claim 1, further comprising evaluation electronics configured for at least one of activation of the pressure sensor element and evaluation of signals from the pressure sensor element,
wherein at least one of the evaluation electronics and the pressure sensor element are mounted on a carrier element and the evaluation electronics are coupled to the contact elements.

10. The pressure detection assembly according to claim 8, wherein the chip is adhesively bonded to a carrier.

11. The pressure detection assembly according to claim 10, wherein at least one of the chip and the carrier element is covered with a protective material.

12. The pressure detection assembly according to claim 1, further comprising a cover configured to close the reception orifice.

13. The pressure detection assembly according to claim 12, the cover further comprising a connecting orifice,
wherein the cover closes the reception orifice with a substantially gas-tight seal.

14. The pressure detection assembly according to claim 1, wherein pressure sensor element is configured to measure an absolute pressure.

15. The pressure detection assembly according to the preceding claim 1, wherein pressure sensor element is affixed to a bottom surface of the reception orifice, and the pressure duct terminates in the reception orifice between the bottom surface and an outer surface of the carrier body.

16. The pressure detection assembly according to claim 1, further comprising a temperature sensor arranged in the pressure duct.

17. The pressure detection assembly according to claim 6, wherein the plug connector portion is not substantially cylindrical.

18. The pressure detection assembly according to claim 9, wherein the carrier element is adhesively bonded to the carrier body.

19. The pressure detection assembly according to claim 1, further comprising an O-ring between the first end of the carrier body and the base element.

20. The pressure detection assembly according to claim 12, wherein the cover comprises at least one of a ridge and a groove and the carrier body comprises at least the other of the groove and the ridge, and wherein the groove and the ridge are configured to mate with each other.

* * * * *